(12) United States Patent
Kashino et al.

(10) Patent No.: US 7,998,637 B2
(45) Date of Patent: Aug. 16, 2011

(54) LIQUID FUEL CELL WITH A PLANER ELECTROLYTE LAYER

(75) Inventors: Hiroshi Kashino, Takatsuki (JP); Yasuo Arishima, Kyoto (JP); Shinsuke Shibata, Ibakaki (JP); Gun Seki, Suita (JP); Shoji Saibara, Suita (JP); Ryo Nagai, Hirakata (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 968 days.

(21) Appl. No.: 10/490,528

(22) PCT Filed: Feb. 14, 2003

(86) PCT No.: PCT/JP03/01595
§ 371 (c)(1),
(2), (4) Date: Mar. 19, 2004

(87) PCT Pub. No.: WO03/069709
PCT Pub. Date: Aug. 21, 2003

(65) Prior Publication Data
US 2005/0100773 A1     May 12, 2005

(30) Foreign Application Priority Data

Feb. 14, 2002  (JP) ................................. 2002-037153
Jun. 17, 2002  (JP) ................................. 2002-176318

(51) Int. Cl.
H01M 8/10      (2006.01)
H01M 8/04      (2006.01)

(52) U.S. Cl. ......... 429/482; 429/465; 429/452; 429/447

(58) Field of Classification Search .................... None
See application file for complete search history.

(56) References Cited

U.S. PATENT DOCUMENTS

| 4,562,123 A | 12/1985 | Shimizu et al. |
| 5,124,060 A * | 6/1992 | Yokouchi et al. ...... 252/62.51 R |
| 5,154,866 A * | 10/1992 | Honda et al. .................. 264/127 |
| 5,702,839 A | 12/1997 | Frost et al. |
| 5,759,712 A | 6/1998 | Hockaday |
| 5,783,324 A * | 7/1998 | Binder et al. ................... 429/31 |
| 5,783,325 A | 7/1998 | Cabasso et al. |

(Continued)

FOREIGN PATENT DOCUMENTS

DE           197 37 390 A1      3/1998

(Continued)

OTHER PUBLICATIONS

English Translation of JP 2000-268836 A; Publication Date Sep. 29, 2000.

(Continued)

*Primary Examiner* — Keith Walker
(74) *Attorney, Agent, or Firm* — Birch, Stewart, Kolasch & Birch, LLP (57) ABSTRACT

A liquid fuel cell comprising a plurality of unit fuel cells each having a positive electrode (8) for reducing oxygen, a negative electrode (9) for oxidizing liquid fuel, and an electrolyte layer (10) interposed between the positive electrode (8) and the negative electrode (9), and a section (3) for storing liquid fuel (4), wherein power can be generated stably while reducing the size by arranging the plurality of unit fuel cells on the substantially same plane. Each electrolyte layer of the unit fuel cell preferably constitutes a continuous integrated electrolyte layer.

10 Claims, 7 Drawing Sheets

U.S. PATENT DOCUMENTS

| | | | |
|---|---|---|---|
| 5,863,672 | A | 1/1999 | Ledjeff et al. |
| 6,630,266 | B2 * | 10/2003 | Hockaday et al. ............. 429/34 |
| 6,869,713 | B2 * | 3/2005 | Kamo et al. ................... 429/31 |
| 2002/0076597 | A1 | 6/2002 | Chang et al. |
| 2002/0102450 | A1 * | 8/2002 | Badding et al. ................ 429/32 |
| 2003/0059659 | A1 | 3/2003 | Kamo et al. |

FOREIGN PATENT DOCUMENTS

| | | |
|---|---|---|
| DE | 197 21 952 A1 | 12/1998 |
| DE | 101 36 753 A | 2/2003 |
| JP | 58-129769 A | 8/1983 |
| JP | 60-62064 A | 4/1985 |
| JP | 63-76264 | 4/1988 |
| JP | 5-41221 | 2/1993 |
| JP | 8-171925 | 7/1996 |
| JP | 10-510390 | 10/1998 |
| JP | 2000-268836 | 9/2000 |
| JP | 2000-268836 A | 9/2000 |
| JP | 2001-283892 | 10/2001 |
| JP | 2003-100315 | 4/2003 |
| WO | WO 99/27599 | 6/1999 |
| WO | WO 00/24072 | 4/2000 |
| WO | WO 01/70392 A1 | 9/2001 |
| WO | WO-01/75999 A1 | 10/2001 |

OTHER PUBLICATIONS

English Translation of JP 5-41221 A; Publication Date Feb. 19, 1993.
English Translation of JP 8-171925 A; Publication Date Jul. 2, 1996.
K. Kordesch et al., "ECS Proceedings", vol. 82-2, No. 265, pp. 427-428 (1982, US).
English Abstract of JP 2000-268836 A; Publication Date Sep. 29, 2000; 1 pg.
English Abstract of JP 5-41221 A; Publication Date Feb. 19, 1993, 1 pg.
English Abstract of JP 8-171925 A; Publication Date Jul. 2, 1996, 1 pg.
English Abstract of JP 63-76264 A; Publication Date Apr. 6, 1988, 1 pg.
English translation of Abstract of DE 101 36 753 A, 1 page.
Official Action mailed on Dec. 27, 2004, in corresponding German patent application No. 10392147.8 (3 pages).
Office Action dated Jul. 13, 2010 in German Patent Application No. 10392147.8-45.

* cited by examiner

LIQUID FUEL CELL WITH A PLANER ELECTROLYTE LAYER

TECHNICAL FIELD

The present invention relates to a liquid fuel cell.

BACKGROUND ART

In recent years, along with the widespread use of cordless equipment such as personal computers and cellular phones, a smaller and higher-capacity secondary battery serving as a power source thereof has been much in demand. At present, as a secondary battery that has a high energy density and can be reduced in size and weight, a lithium ion secondary battery is being commercialized. The demand therefor as a portable power source is increasing. However, depending on the kinds of cordless equipment to be used, this lithium ion secondary battery has not yet been able to guarantee sufficient hours of continuous use.

Under such circumstances, as an example of a battery capable of satisfying the above-described demand, an air cell and a fuel cell can be considered. An air cell is considered to be suitable for increasing energy density because it utilizes oxygen in the air as a positive active material and allows a negative electrode to fill most of the inner volume of the cell. However, this air cell has a problem that an alkali solution used as an electrolyte solution reacts with carbon dioxide in the air and degrades, leading to a large self-discharge.

On the other hand, a fuel cell does not have such a problem. In particular, a fuel cell utilizing a liquid fuel directly for battery reaction, for example, a direct methanol fuel cell can be miniaturized and, therefore, holds a great promise as a future portable power source (see JP 2000-268836 A, for example).

Both of positive and negative electrodes of this direct methanol fuel cell contain a catalyst obtained by highly dispersing precious metal particles in carbon powder, a proton exchange resin and polytetrafluoroethylene (PTFE). The use of this PTFE as a binder makes it possible to form the electrodes having a certain strength and to provide the electrodes with water repellency (for example, see Kordesch and two others, "ECS Proceedings," (US), 1982, vol. 82-2, No. 265, pp. 427-428).

In the above-described fuel cell, the negative electrode is supplied with the fuel and reaction occurs, while oxygen reacts in the positive electrode. Thus, by simply supplying the fuel and oxygen, the cell can be used continuously. However, since a conventional fuel cell has been constituted by layering a plurality of unit fuel cells, the total cell thickness is large. Also, it has been necessary to circulate and supply oxygen and the fuel to the negative and positive electrodes respectively, aids therefor are needed. Consequently, the fuel cell has been much larger than small-size secondary batteries such as a lithium ion secondary battery.

On the other hand, the aids for forcibly circulating oxygen and the fuel could be eliminated to miniaturize a fuel cell. However, this may cause problems that an output drops and that gases such as carbon dioxide generated in a discharge reaction build up in a fuel chamber and thus, with a consumption of the fuel, the fuel loses contact with the negative electrode.

In order to avoid the above-described problems caused by discharge products, an exhaust hole with a PTFE porous film can be provided in the fuel chamber, thereby letting out the generated gases to the outside. However, depending on the composition of the fuel, more specifically, in the case of using an alcohol aqueous solution with high concentration, there is a problem that the fuel passes through the porous film and leaks out.

Furthermore, in the case of the fuel cell in which a plurality of unit fuel cells are disposed and electrically connected, each of the unit cells has to have a sealing portion for preventing the fuel leakage. Since the fuel leakage occurs easily when the sealing is not sufficient, the structure of the sealing portion becomes more and more complicated with a view to increasing reliability. This easily causes a problem that miniaturization to a certain extent or more becomes difficult.

Moreover, not only the structure of the entire cell, but also the structure of each unit fuel cell has had room for improvement. For example, since oxygen gas reaction occurs in the positive electrode of the fuel cell, water repellency is required for removing moisture that inhibits this reaction. On the other hand, in the negative electrode where the reaction of methanol serving as a liquid fuel is to occur, the liquid fuel cannot be oxidized easily owing to poor wettability of the electrode if the electrode has water repellency. However, in the conventional direct methanol fuel cell, both of the positive electrode and the negative electrode contain PTFE as the binder and are provided with water repellency. Therefore, the negative electrode itself has not necessarily had an optimal structure.

DISCLOSURE OF INVENTION

In one or more embodiments, the present invention provides a liquid fuel cell including a plurality of unit fuel cells and a liquid fuel storing portion for storing a liquid fuel. Each of the unit fuel cells includes a positive electrode for reducing oxygen, a negative electrode for oxidizing a liquid fuel, and an electrolyte layer disposed between the positive electrode and the negative electrode. The plurality of unit fuel cells are disposed on substantially the same plane.

BRIEF DESCRIPTION OF DRAWINGS

in FIG. 7.

BEST MODE FOR CARRYING OUT THE INVENTION

The present invention solves the above-described problems of the conventional liquid fuel cell and provides a liquid fuel cell that is small and capable of generating electricity in a stable manner.

A liquid fuel cell of one embodiment of the present invention includes a plurality of unit fuel cells and a liquid fuel storing portion for storing a liquid fuel. Each of the unit fuel cells includes a positive electrode for reducing oxygen, a negative electrode for oxidizing a liquid fuel, and an electrolyte layer disposed between the positive electrode and the negative electrode. The plurality of unit fuel cells are disposed on substantially the same plane. With the unit fuel cells each disposed as above, it becomes possible to reduce the thickness of the liquid fuel cell. Furthermore, the plurality of unit fuel cells can be supplied with the liquid fuel from the same liquid fuel storing portion, thus achieving a smaller liquid fuel cell.

Also, in the liquid fuel cell of one embodiment of the present invention, it is preferable that the electrolyte layers of the plurality of unit fuel cells are constituted continuously as an integral electrolyte layer. By providing the plurality of unit fuel cells so as to be adjacent to each other in the continuous electrolyte layer, the gap between the plurality of unit fuel cells is covered with the electrolyte layer. Accordingly, a sealing portion for preventing fuel leakage that has been required conventionally in each unit cell can be omitted or simplified, making it possible not only to prevent the liquid fuel from leaking out but also to achieve the simplification of cell assembly and further miniaturization of the cell.

Further, in the liquid fuel cell of one embodiment of the present invention, it is preferable that the electrolyte layers of the plurality of unit fuel cells are independent from each other via an insulator layer and constituted as a continuous layer integral with the insulator layer. With this structure, in addition to the above-described effect obtained in the case of using the continuously-constituted integral electrolyte layer, it is possible to prevent the discharge reaction from proceeding between the electrodes of the adjacent unit fuel cells. In other words, in the case of using the continuously-constituted integral electrolyte layer, when the space between the adjacent unit cells for the purpose of miniaturizing the fuel cell is reduced excessively, not only does the discharge reaction proceed between the positive electrode and the negative electrode in a single unit cell but also the discharge reaction occurs between the positive electrode and the negative electrode of the adjacent unit cells, increasing the likelihood of a phenomenon that the actual cell capacity drops (short-circuit). However, this can be prevented by making the electrolyte layers of the plurality of unit cells independent from each other via the insulator layer.

Moreover, in the liquid fuel cell of one embodiment of the present invention, it is preferable that the liquid fuel storing portion includes a gas-liquid separation hole having a gas-liquid separation film. With this structure, carbon dioxide etc. generated in the discharge reaction do not build up in the cell, and the carbon dioxide can be released smoothly from the cell. Thus, it is possible to eliminate the aids for supplying the fuel so as to miniaturize the fuel cell.

Furthermore, in the liquid fuel cell of one embodiment of the present invention, it is preferable that the gas-liquid separation film is a porous fluorocarbon resin film treated to be oil repellent or a laminate composite, treated to be oil repellent, of a porous fluorocarbon resin film and other gas-transmitting materials. The gas-liquid separation film formed of these materials can prevent an oleophilic liquid fuel such as methanol or ethanol from passing through the gas-liquid separation hole. Accordingly, even when using an oleophilic liquid fuel with high concentration, it is possible to prevent the liquid fuel from leaking out.

Additionally, in the liquid fuel cell of one embodiment of the present invention, it is preferable that the catalyst layer of the negative electrode contains a binder having no ionic conductivity and no fluorine. This increases the wettability between the negative electrode and the liquid fuel, thus improving the electrode characteristics. Therefore, it becomes possible to improve the discharge characteristics of the unit fuel cell. Further, since the binder has no ionic conductivity, the binder does not swell or melt easily owing to the liquid fuel. Thus, the cell stability increases, making it possible to improve the reliability of the fuel cell.

The following is a description of embodiments of the present invention.

First Embodiment

Figure 1:
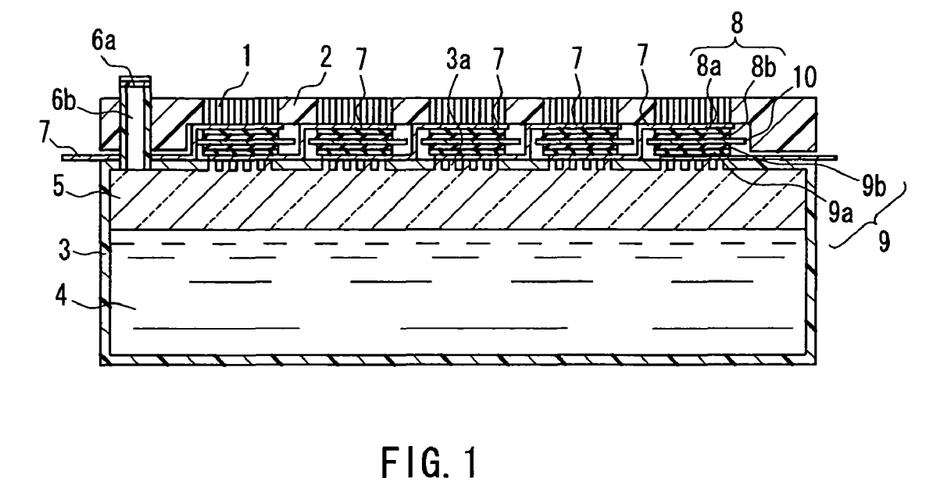
FIG. 1 is a sectional view showing a liquid fuel cell according to a first embodiment of the present invention.

FIG. 1 is a sectional view showing a liquid fuel cell of the first embodiment of the present invention. A positive electrode 8 is a laminate including a diffusion layer 8a formed of a porous carbon material, for example, and a catalyst layer 8b containing catalyst-carrying carbon powder, a proton conducting substance and a fluorocarbon resin binder. The positive electrode 8 has a function of reducing oxygen, and for the catalyst therein, platinum fine particles or fine particles of an alloy of platinum with iron, nickel, cobalt, tin, ruthenium or gold can be used, for example. The proton conducting substance can be, for example, a resin having a sulfonic acid group such as a polyperfluorosulfonic acid resin, a sulfonated polyethersulfonic acid resin or a sulfonated polyimide resin but is not limited to the above. It is preferable that the content of this proton conducting substance is 2 to 200 parts by mass with respect to 100 parts by mass catalyst carrying carbon powder. Within this range, a sufficient proton conductivity can be obtained, and the cell performance does not drop because an electric resistance does not increase.

Examples of the fluorocarbon resin binder include PTFE, tetrafluoroethylene-perfluoroalkyl vinyl ether copolymer (PFA), tetrafluoroethylene-hexafluoropropylene copolymer (FEP), tetrafluoroethylene-ethylene copolymer (E/TFE), polyvinylidene fluoride (PVDF) and polychloro-trifluoroethylene (PCTFE). It is preferable that the amount of this binder is 0.01 to 100 parts by mass with respect to 100 parts by mass catalyst carrying carbon powder. Although the binder does not need to be used, the presence of 0.01 parts by mass or more binder generates a sufficient binding property, making it easier to form and retain the catalyst layer. The presence of 100 parts by mass or less can suppress an increase in electric resistance, making it possible to prevent the cell performance from lowering.

In some cases, a paste of carbon powder containing PTFE resin particles is applied to the catalyst layer side of the diffusion layer 8a for improving water repellency.

An electrolyte layer 10 can be formed of a material having no electron conducting property and capable of transporting protons. For example, the electrolyte layer 10 is formed of a polyperfluorosulfonic acid resin film, more specifically, "Nafion" (trade name) manufactured by DuPont. Co., "Flemion" (trade name) manufactured by ASAHI GLASS CO., LTD. or "Aciplex" (trade name) manufactured by Asahi Kasei Corporation. Other than the above, it also may be possible to use a sulfonated polyethersulfonic acid film, a sulfonated polyimide resin film or a sulfuric acid-doped polybenzimidazole film.

A negative electrode 9 has a function of generating protons from a liquid fuel, in other words, a function of oxidizing a liquid fuel. The negative electrode 9 is a laminate including a diffusion layer 9a formed of a porous carbon material, for example, and a catalyst layer 9b containing catalyst-carrying carbon powder, a proton conducting substance and a fluorocarbon resin binder.

The catalyst-carrying carbon powder, the proton conducting substance and the binder can be similar to those in the positive electrode described above. The mass ratio of the catalyst to the carbon powder is preferable if 5 to 400 parts by mass catalyst is contained with respect to 100 parts by mass carbon powder. Within this range, a sufficient catalytic activity can be achieved, and the catalytic activity does not drop because the particle diameter of the catalyst does not increase excessively.

It is preferable that the content of the proton conducting substance is 2 to 200 parts by mass with respect to 100 parts by mass catalyst carrying carbon powder. Within this range, a sufficient proton conductivity can be obtained, and the cell performance does not drop because an electric resistance does not increase.

Instead of the fluorocarbon resin binder mentioned above or together with that fluorocarbon resin binder, a binder having no ionic conductivity and no fluorine (non-fluorine-based binder) can be used to improve wettability between the negative electrode and the liquid fuel, thereby achieving excellent electrode characteristics.

Although various kinds of binders can be used as the non-fluorine-based binder having no ionic conductivity, it is preferable that such a binder has thermoplasticity because the electrode can be produced more easily. It is preferable that this thermoplastic binder contains at least one selected from the group consisting of polyethylene, polypropylene, nylon, polyester, ionomer, butyl rubber, ethylene-vinyl acetate copolymer, ethylene-ethylacrylate copolymer and ethylene-acrylic acid copolymer.

Further, it also is possible to use a thermosetting resin as the non-fluorine-based binder having no ionic conductivity. For example, an epoxy resin, a xylene resin, a diallyl phthalate resin, an unsaturated polyester resin, a phenolic resin or the like can be used.

Here, it is preferable that the non-fluorine-based binder having no ionic conductivity has a particle diameter of 0.01 to 100 µm. Within this range, a sufficient binding property can be achieved, and the binder itself does not become bulky, thus allowing a uniform dispersion in the catalyst.

Also, it is preferable that the content of the binder is 0.01 to 100 parts by mass with respect to 100 parts by mass catalyst carrying carbon powder. Within this range, a sufficient binding property can be achieved, and the cell performance does not drop because an electric resistance does not increase.

Next, the method for manufacturing the positive and negative electrodes by using the above-described materials will be described. First, the catalyst carrying carbon powder, the proton conducting substance, the binder described above and water together with an organic solvent are dispersed uniformly so as to prepare slurry. It is preferable that the amount of solids in this slurry is 1 to 70 parts by mass with respect to 100 parts by mass of the total mass of the slurry. This is because less than 1 part by mass solids cannot achieve a sufficient viscosity, leading to poor workability, while more than 70 parts by mass solids increase the viscosity excessively, leading to poor workability. These materials can be dispersed using, for example, a ball mill, a homogenizer or an ultrasonic disperser, but there is no particular limitation to the above. In addition, as the organic solvent, it is possible to use methanol, ethanol, propanol or butanol, for example.

Thereafter, the slurry obtained as above is applied to the diffusion layer formed of a porous carbon material and dried. By a subsequent hot pressing, the binder melts and binds, thus forming the electrode. The temperature of hot pressing varies depending on the kinds of the binder but preferably is set to be equal to or higher than a glass transition point of the binder to be used and not to exceed the glass transition point by 20° C. It is preferable that the pressing is carried out at 3 to 50 MPa.

The pressure lower than 3 MPa cannot form the electrode sufficiently, while that exceeding 50 MPa would crush pores in the electrode, lowering the cell performance.

The electrolyte layer 10 is sandwiched by the positive electrode 8 and the negative electrode 9 described above, followed by compression bonding with a hot press, thereby producing a unit fuel cell. It is preferable that the temperature of the hot press is set to be 100° C. to 180° C. It is preferable that the pressing is carried out at 3 to 50 MPa. The temperature lower than 100° C. or the pressure lower than 3 MPa cannot form the electrode sufficiently, while the temperature exceeding 180° C. or the pressure exceeding 50 MPa would crush pores in the electrode, lowering the cell performance. A plurality of the assembled unit cells are disposed on substantially the same plane and electrically connected with each other, thus assembling a liquid fuel cell.

A fuel tank 3 for storing a liquid fuel 4 is provided in the vicinity of and on the opposite side of the electrolyte layer 10 with respect to the negative electrode 9. The fuel tank 3 supplies the liquid fuel 4 to a plurality of the unit fuel cells. In other words, a plurality of the unit fuel cells share a single fuel tank.

The liquid fuel 4 can be, for example, a methanol aqueous solution, an ethanol aqueous solution, dimethyl ether, a sodium borohydride aqueous solution, a potassium borohydride aqueous solution or a lithium borohydride aqueous solution.

The fuel tank 3 is formed of plastics such as PTFE, rigid polyvinyl chloride, polypropylene or polyethylene or anti-corrosion metals such as stainless steel, for example. However, when forming the fuel tank 3 with metal, it is necessary to provide an insulator so that the negative electrodes disposed on substantially the same plane are not short-circuited electrically.

The portion of the fuel tank 3 contacting the negative electrode 9 is provided with fuel supply holes 3*a*, through which the liquid fuel 4 is supplied to the negative electrode 9. Also, a fuel suction material 5 serving as a liquid fuel impregnation portion for retaining the liquid fuel 4 by impregnation and supplying the liquid fuel 4 to the negative electrode 9 is provided inside the fuel tank 3 including a part contacting the negative electrode 9. In this manner, the contact between the liquid fuel 4 and the negative electrode 9 is maintained even when the liquid fuel 4 is consumed, so that the liquid fuel 4 can be used completely. For the fuel suction material 5, a glass fiber can be used, and other materials also may be used as long as its dimension does not vary very much owing to the impregnation with the fuel and its chemical property is stable.

On the opposite side of the electrolyte layer 10, the positive electrode 8 is provided with a cover plate 2, whose portion contacting the positive electrode 8 has air holes 1. In this manner, oxygen in the air can contact the positive electrode 8 through the air holes 1. An end portion of the cover plate 2 is provided with a gas-liquid separation hole 6*b* having a structure penetrating the cover plate 2 and the fuel tank 3. On the side opposite to the fuel tank 3, this gas-liquid separation hole 6*b* has a detachable gas-liquid separation film 6*a*. This gas-liquid separation film 6*a* is formed of a PTFE sheet having minute pores and can release carbon dioxide etc. generated in the discharge reaction from the fuel tank 3 without leaking the liquid fuel 4. With this detachability of the gas-liquid separation film 6*a*, the gas-liquid separation hole 6*b* also can serve as a filling port for refilling the liquid fuel 4. The gas-liquid separation hole 6*b*, the cover plate 2 and the air holes 1 can be formed of, for example, a material similar to that of the fuel tank 3.

Instead of the PTFE sheet having minute pores mentioned above, a porous fluorocarbon resin film treated to be oil repellent or a laminate composite, treated to be oil repellent, of a porous fluorocarbon resin film and other gas-transmitting materials can be used to form the gas-liquid separation film 6a. In this manner, it becomes possible to prevent an oleophilic liquid fuel from passing through the gas-liquid separation hole. Accordingly, even when using an oleophilic liquid fuel with high concentration, it is possible to prevent the liquid fuel 4 from leaking out from the fuel tank 3.

Examples of fluorocarbon resins that can be used for the above-mentioned porous fluorocarbon resin film include PTFE, PFA, FEP, E/TFE, PVDF, PCTFE, chlorotrifluoroethylene-ethylene copolymer (E/CTFE), perfluoro ring polymer and polyvinyl fluoride (PVF).

The porous fluorocarbon resin film treated to be oil repellent described above can be produced by, for example, forming a polymer coating film having a fluoroalkyl group with two or more fluorine atoms on the surface of the porous fluorocarbon resin film. The above-noted fluoroalkyl group preferably has four or more carbon atoms and most desirably is a perfluroalkyl group whose hydrogen atoms are all substituted for fluorine atoms. Using an organic solvent capable of dissolving or dispersing such a polymer having a fluoroalkyl group, for example, a fluorine-based solvent such as perfluorobenzene, perfluorotributylamine or perfluorohexane, a coating solution of the above-mentioned polymer is prepared so as to be used as an oil-repellent treatment agent. By applying this agent to the porous fluorocarbon resin film or immersing the porous fluorocarbon resin film into this agent, the above-mentioned polymer coating film having a fluoroalkyl group is formed on the surface of the porous fluorocarbon resin film. A commercially available product of such an oil-repellent treatment agent can be, for example, "UNIDYNE" (trade name), which is a water and oil repellent manufactured by DAIKIN INDUSTRIES, Ltd. Further, after forming the coating film, the porous fluorocarbon resin film can be subjected to a heat treatment at about 50° C. to 200° C., thereby improving the oil repellent performance.

Moreover, besides using the porous fluorocarbon resin film alone, the laminate composite of the porous fluorocarbon resin film and other gas-transmitting materials such as woven fabric, nonwoven fabric, net or felt also can be used. In the case of using such a laminate composite, not the porous fluorocarbon resin film but the gas-transmitting material to be laminated thereto may be treated to be oil repellent. Of course, it may be possible to treat the side of the porous fluorocarbon resin film to be oil repellent or to treat both to be oil repellent.

A commercially available product of such a laminate composite having at least a porous fluorocarbon resin film treated to be oil repellent can be, for example, "NTF2131A-PS06" (trade name) and "NTF2133A-S06" (trade name), which are filters manufactured by Nitto Denko Corporation.

The porous fluorocarbon resin film treated to be oil repellent to be used in the liquid fuel cell of the present embodiment has a leakage prevention effect with respect to the liquid fuel of methanol, ethanol, dimethyl ether and all the other oleophilic solutions.

The unit fuel cells are electrically connected with each other in the following manner. A current collector 7 is provided from the part contacting the positive electrode 8 to the part contacting the negative electrode 9 of the adjacent unit fuel cell, whereby the positive electrode 8 and the negative electrode 9 of the adjacent unit fuel cell are electrically connected. The current collector 7 has a function of electrically connecting in series the unit fuel cells adjacent to each other. All the unit fuel cells aligned on substantially the same plane are electrically connected in series by the current collectors 7. This can increase a cell output while miniaturizing the cell. The current collector 7 can be formed of, for example, carbon, precious metal such as platinum or gold, or anti-corrosion metal such as stainless steel.

The above-mentioned unit fuel cells aligned on substantially the same plane can form not only a single layer but also a laminate of a plurality of them.

Second Embodiment

Figure 2:
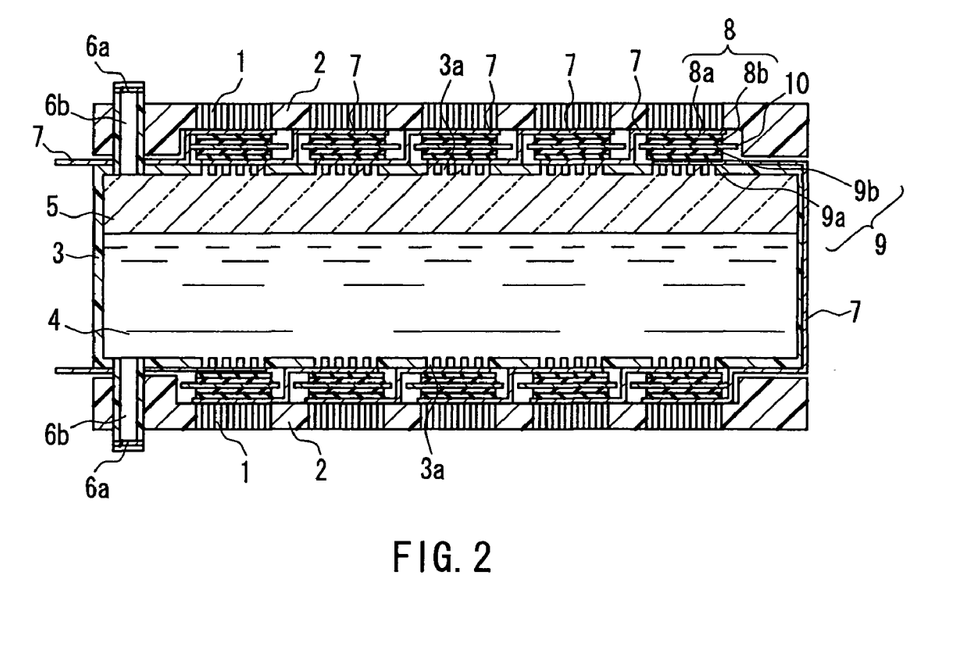
FIG. 2 is a sectional view showing a liquid fuel cell according to a second embodiment of the present invention.

FIG. 2 is a sectional view showing a liquid fuel cell of the second embodiment of the present invention. The present embodiment is directed to a structure similar to that in the first embodiment except that portions above and below the fuel tank 3 are formed to be substantially symmetrical.

Third Embodiment

Figure 3:
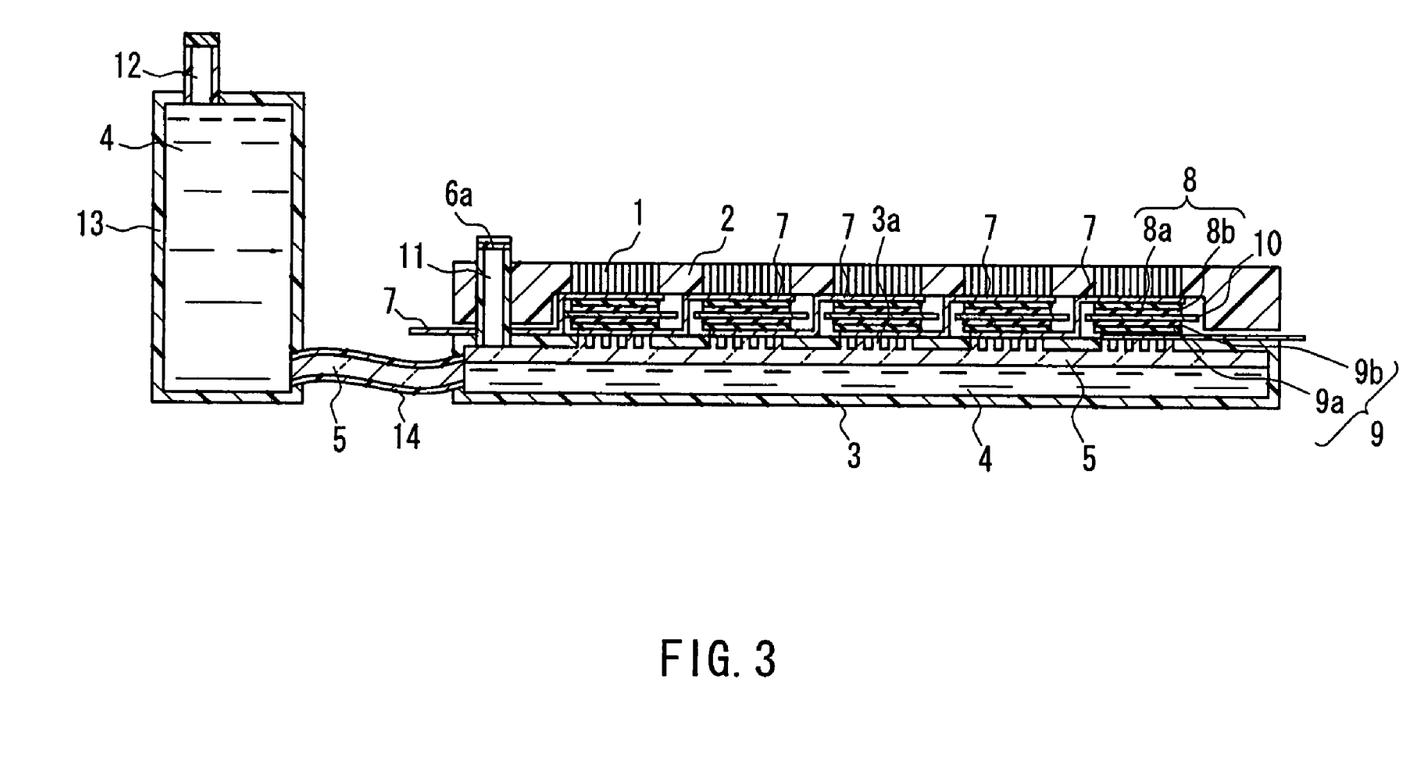
FIG. 3 is a sectional view showing a liquid fuel cell according to a third embodiment of the present invention.

FIG. 3 is a sectional view showing a liquid fuel cell of the third embodiment of the present invention. In the present embodiment, the fuel tank 3 and an outside fuel tank 13 are connected by a fuel supply passage 14 having the fuel suction material 5 therein. The fuel tank 13 is filled with the liquid fuel 4 similarly to the fuel tank 3 and has a function of supplying the liquid fuel 4 continuously through the fuel supply passage 14. The fuel tank 13 can be formed of, for example, a material similar to that for the fuel tank 3. The fuel supply passage 14 can be formed of, for example, a material similar to that for the fuel tank 3 or a flexible rubber such as a natural rubber. The fuel tank 13 has a fuel filling port 12 and a function of additionally filling the liquid fuel. Numeral 11 denotes a gas-liquid separation hole. Other structures of the present embodiment are substantially the same as that of the first embodiment.

Fourth Embodiment

Figure 4:
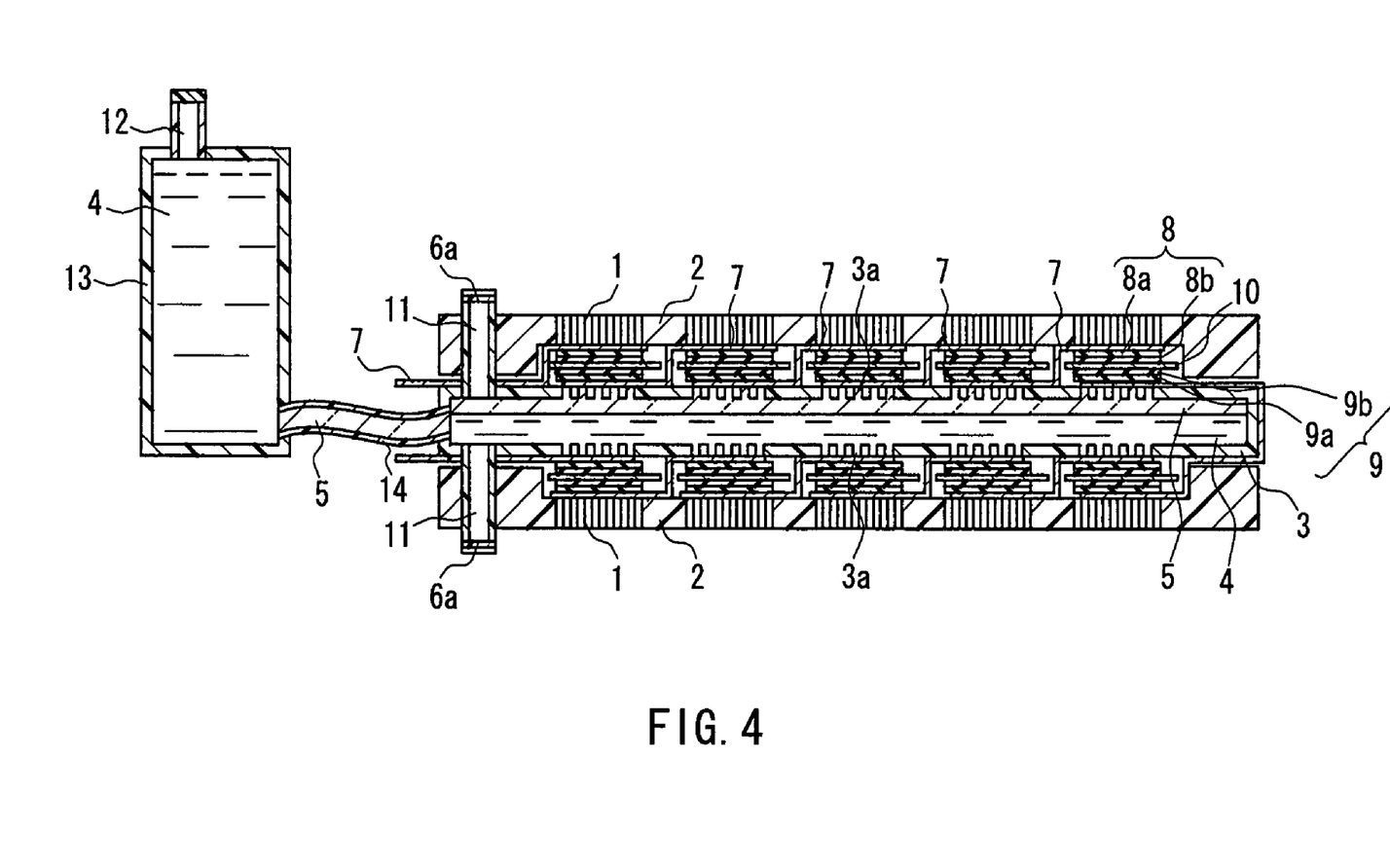
FIG. 4 is a sectional view showing a liquid fuel cell according to a fourth embodiment of the present invention.

FIG. 4 is a sectional view showing a liquid fuel cell of the fourth embodiment of the present invention. The present embodiment is directed to a structure similar to that in the third embodiment except that portions above and below the fuel tank 3 are formed to be substantially symmetrical.

Fifth Embodiment

Figure 5:
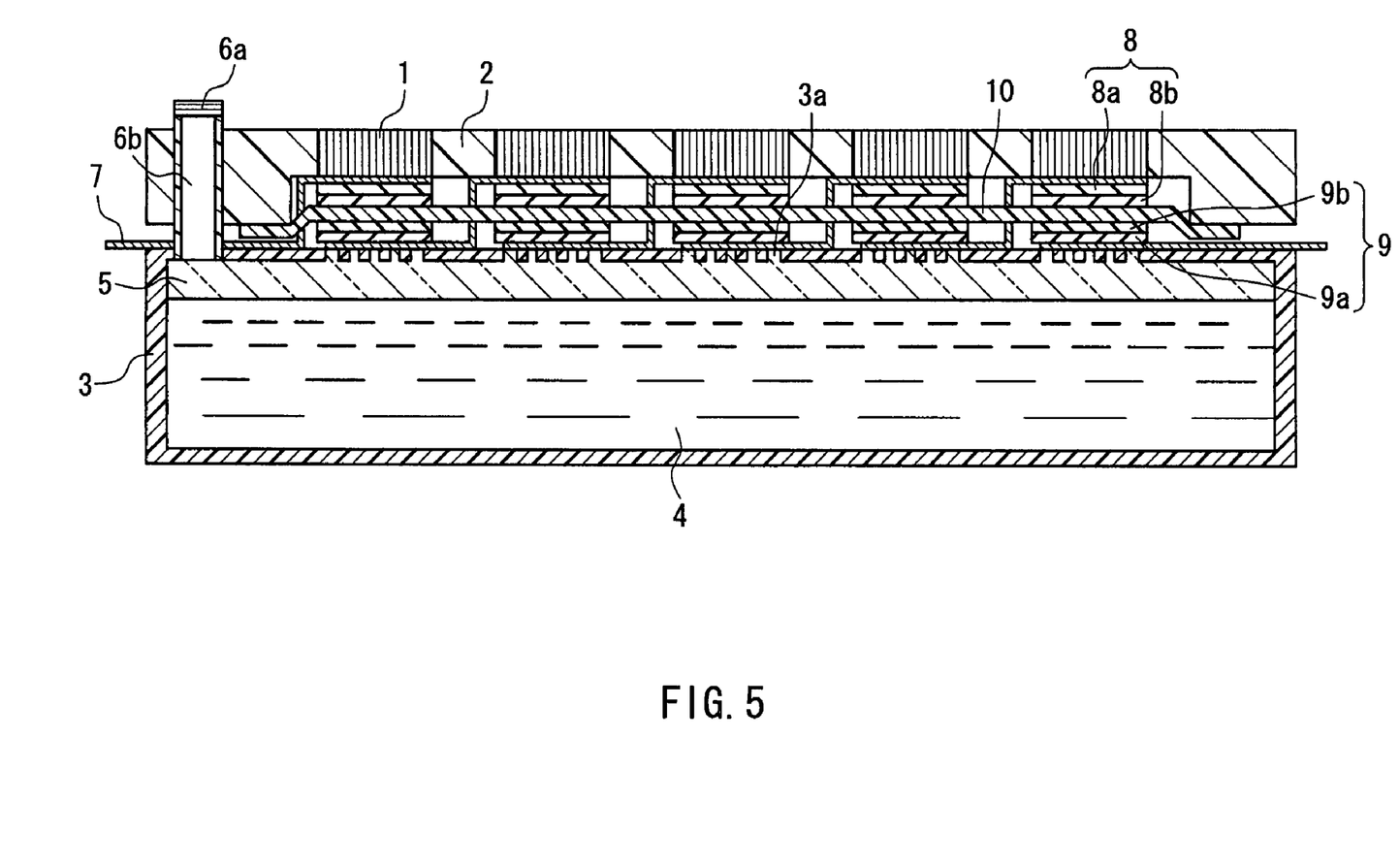
FIG. 5 is a sectional view showing a liquid fuel cell according to a fifth embodiment of the present invention.

FIG. 5 is a sectional view showing a liquid fuel cell of the fifth embodiment of the present invention. The present embodiment is directed to a structure in which the electrolyte layers of the unit fuel cells in the first embodiment are constituted continuously as an integral electrolyte layer 10. The structure of the present embodiment is substantially similar to that of the first embodiment except for the structure of the electrolyte layer 10. In this case, in order to prevent electric current leakage (liquid short circuit) between the electrodes of the adjacent unit cells, the space between the unit fuel cells preferably is 10 to 500 times, more preferably is 10 to 100 times, as large as the distance between the positive electrode 8 and the negative electrode 9 (the thickness of the electrolyte layer 10).

In the present embodiment, since the gap between the unit fuel cells is covered with the electrolyte layer 10, it is unnecessary to provide each unit cell with a sealing portion for preventing the leakage of the liquid fuel 4. Thus, the fuel leakage can be prevented with a structure simpler than those of the first to fourth embodiments.

Sixth Embodiment

Figure 6:
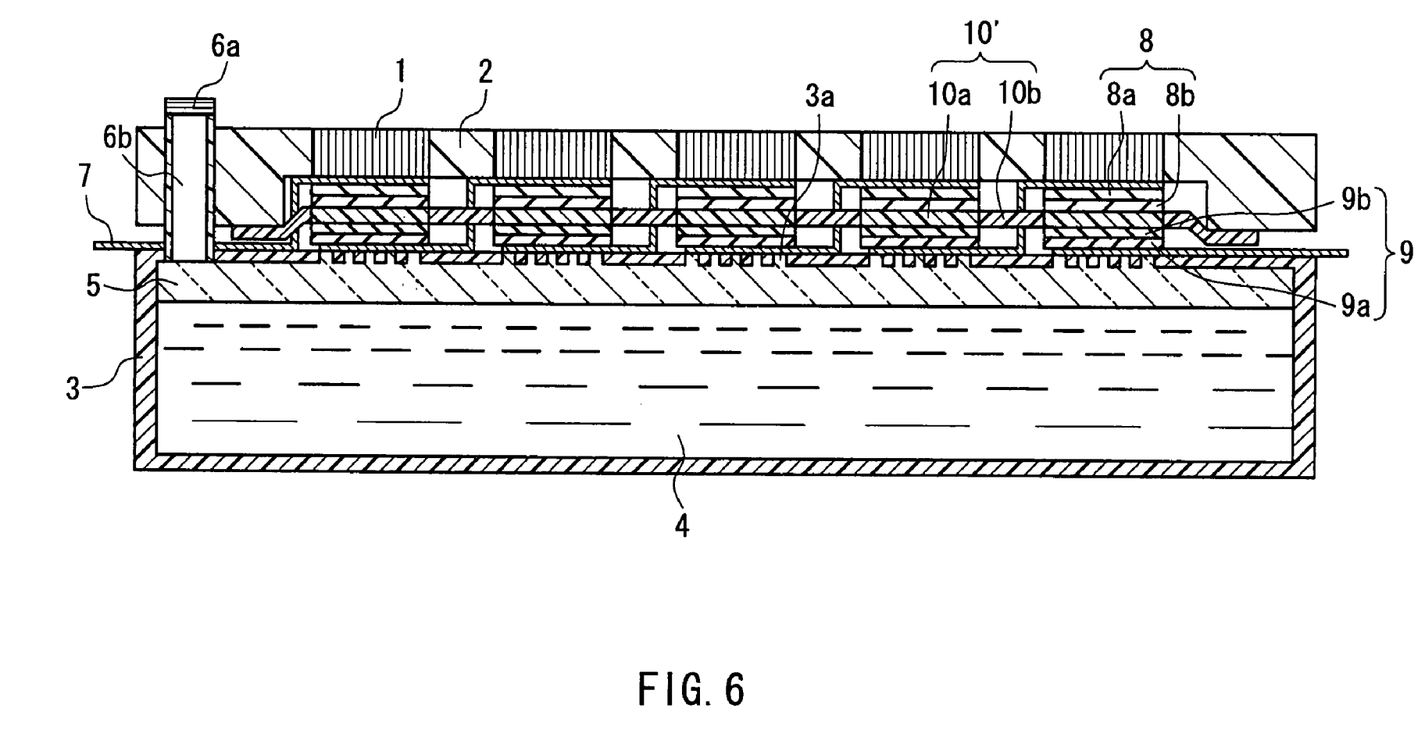
FIG. 6 is a sectional view showing a liquid fuel cell according to a sixth embodiment of the present invention.
Figure 7:
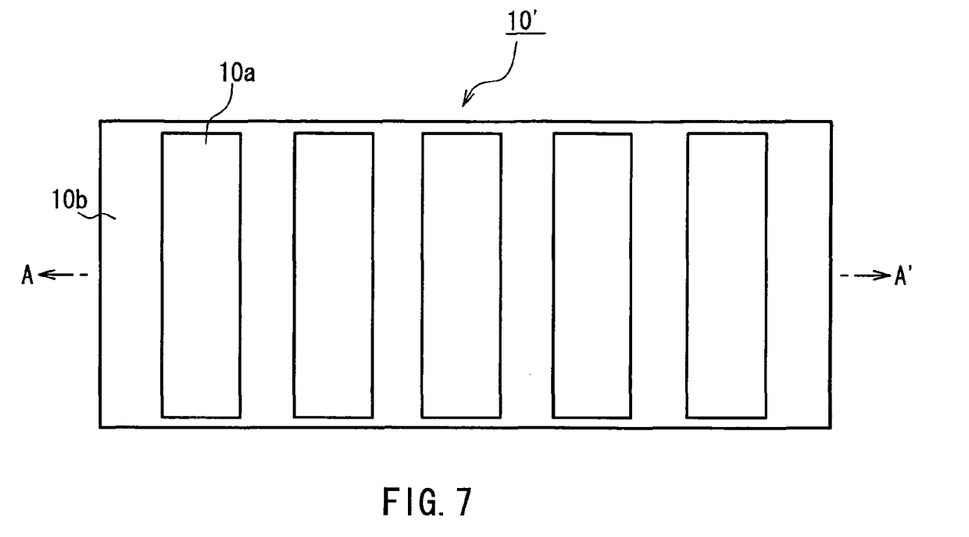
FIG. 7 is a plan view showing an electrolyte-insulator continuous film used in the sixth embodiment of the present invention.
Figure 8:
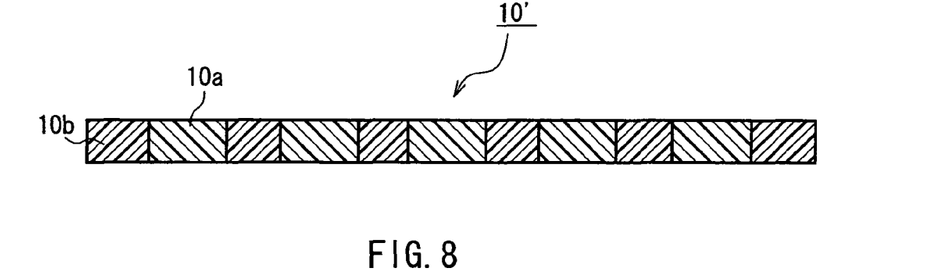
FIG. 8 is a sectional view taken along a line A-A.

FIG. 6 is a sectional view showing a liquid fuel cell of the sixth embodiment of the present invention. Also, FIG. 7 is a plan view showing an electrolyte-insulator continuous layer used in the present embodiment, and FIG. 8 is a sectional view taken along a line A-A: in FIG. 7. In the present embodiment, electrolyte layers 10a of the unit fuel cells are independent from each other via an insulator layer 10b and constituted as an electrolyte-insulator continuous layer 10' integral with this insulator layer 10b. In other words, the present embodiment is directed to a structure similar to that of the fifth embodiment except that a portion in the electrolyte layer between the unit cells in the fifth embodiment is replaced by the insulator layer so as to form the integral electrolyte-insulator continuous layer 10'.

The insulator layer 10b can be formed of, for example, polyethylene, polypropylene, polyvinyl chloride, an acrylic resin, polystyrene, polyvinyl alcohol, polytetrafluoroethylene, polyvinyl pyrrolidone, polyethylene glycol, polycarbonate, nylon, silicone, epoxy, polydimethylsiloxane, cellulose, polyethylene terephthalate, polyurethane, a polyglycolic acid, polybutylene terephthalate, polysulfone, polyethersulfone, polyphenylene sulfide, polyamide imide, polyetherimide, polyether ether ketone or polyimide.

In the present embodiment, since the electrolyte layers 10a of the unit fuel cells are separated by the insulator layer 10b, no liquid short-circuit occurs even when the space between the unit fuel cells is reduced. Thus, it is possible to achieve even smaller cell compared with the fifth embodiment described above.

Hereinafter, the liquid fuel cell of the present invention will be described more specifically by way of examples. However, the present invention is not limited to the examples below.

Example 1

The liquid fuel cell with a structure similar to that in FIG. 1 was produced in the following manner.

The positive electrode was produced as follows. First, 50 parts by mass "Ketjen Black EC" (trade name) manufactured by LION AKZO CO., LTD., 10 parts by mass platinum carrying carbon in which 50 parts by mass platinum fine particles having a mean particle diameter of 3 nm were carried, 75 parts by mass "Nafion" (trade name; solids concentration: 5% by mass), which was a proton conducting substance manufactured by ElectroChem, Inc., 10 parts by mass PTFE emulsion solution "D1" (trade name; emulsion concentration: 60% by mass) manufactured by DAIKIN INDUSTRIES, Ltd. as the fluorocarbon resin binder and 5 parts by mass water were prepared. They were mixed and dispersed with a homogenizer and then applied to a carbon cloth serving as the diffusion layer so that the platinum amount was 8 mg/cm$^2$, followed by drying. Next, hot pressing was carried out at 120° C. at 10 MPa for 2 minutes so as to form the resultant article into an electrode, thus obtaining the positive electrode.

The negative electrode was produced as follows. First, 50 parts by mass "Ketjen Black EC" mentioned above, 10 parts by mass platinum carrying carbon in which 50 parts by mass platinum-ruthenium alloy fine particles (alloy mass ratio was 1:1) having a mean particle diameter of 3 nm were carried, 75 parts by mass "Nafion" mentioned above, 5 parts by mass polyethylene powder having a mean molecular weight of 15000 and a mean particle diameter of 1 μm as the non-fluorine-based binder and 10 parts by mass water were prepared. They were mixed and dispersed uniformly with a homogenizer and then applied to a carbon cloth serving as the diffusion layer so that the platinum amount was 8 mg/cm$^2$, followed by drying. Next, hot pressing was carried out at 120° C. at 10 MPa for 2 minutes so as to form the resultant article into an electrode, thus obtaining the negative electrode.

As the electrolyte layer, "Nafion 117" (trade name) manufactured by DuPont. Co. was used. This electrolyte layer was sandwiched by the positive electrode and the negative electrode and hot-pressed at 120° C. at 10 MPa for 3 minutes, thus producing the unit fuel cell. The positive and negative electrodes both had an area of 10 cm$^2$.

The cover plate and the fuel tank were formed of a material obtained by applying "Micas A" (trade name), which was a phenolic resin-based paint manufactured by NIPPON PAINT Co., Ltd., as an insulating coating film to stainless steel (SUS316). The positive electrode collector was made of a gold sheet having a thickness of 10 μm and bonded to the positive electrode by using an epoxy resin. The liquid fuel was a 5% by mass methanol aqueous solution. The negative electrode collector was made of a material similar to the positive electrode collector. The gas-liquid separation film was formed of a PTFE film having minute pores.

Example 2

The liquid fuel cell was produced similarly to Example 1 except that, as the non-fluorine-based binder in the catalyst layer of the negative electrode, the above-noted 5 parts by mass polyethylene powder was replaced by 5 parts by mass ethylene-ethylacrylate copolymer powder having a mean particle diameter of 1 μm and the heating temperature for pressing was 160° C.

Example 3

The liquid fuel cell was produced similarly to Example 1 except that the above-noted 5 parts by mass polyethylene powder serving as the binder in the catalyst layer of the negative electrode and 10 parts by mass water were replaced by the above-noted 10 parts by mass PTFE emulsion solution "D1" serving as the fluorocarbon resin binder and 5 parts by mass water and the heating temperature for pressing was 160° C.

When 500 mA was applied to each of the liquid fuel cells of Examples 1 to 3 produced as above at room temperature (20° C.), an operating voltage thereof was measured. Table 1 shows the results of the measurement.

TABLE 1

| | Operating voltage (V) |
|---|---|
| Example 1 | 1.32 |
| Example 2 | 1.30 |
| Example 3 | 0.90 |

As becomes clear from Table 1, since Example 1 and Example 2 use the non-fluorine-based binder in the catalyst layer of the negative electrode, they have a higher operating voltage than Example 3. This may be because the non-fluorine-based binder used for the negative electrode in Examples 1 and 2 increases wettability of the negative electrode with respect to the methanol aqueous solution, accelerating an oxidation reaction of methanol, thus improving the negative electrode performance.

Example 4

First, as shown in FIGS. 7 and 8, a 50 μm thick insulator sheet made of polyethersulfone was prepared and provided with through holes so that the electrolyte layers could be disposed in the portions where the positive and negative electrodes were to be laminated. Thereafter, the above-mentioned "Nafion" solution manufactured by ElectroChem, Inc. was poured into these through holes and then dried to set, thereby forming the electrolyte-insulator continuous film.

Next, as shown in FIG. 6, the positive electrode 8 was constituted by the diffusion layer 8a formed of a carbon paper having a porosity of 78% and a thickness of 280 μm and the catalyst layer 8b having a thickness of 50 μm in which platinum particles with a particle diameter of 2 to 5 nm were carried by carbon particles with a particle diameter of 30 nm.

Here, the positive electrode 8 was produced in the following manner. First, a commercially available platinum carrying carbon mentioned above and ion exchanged water were mixed and stirred, followed by viscosity adjustment, thus preparing ink for catalyst. This ink was applied to the above-noted carbon paper, dried and then hot-pressed and joined onto the electrolyte layer portions formed on the above-noted insulator sheet.

The negative electrode 9 was produced in a manner similar to the positive electrode 8 described above except that the above-mentioned platinum carrying carbon was replaced by platinum-ruthenium alloy particles (alloy mass ratio was 1:1) having a particle diameter of 5 to 10 nm.

The liquid fuel cell shown in FIG. 6 was produced similarly to Example 1 except that the unit fuel cells produced as above and 3% by mass methanol aqueous solution as the liquid fuel were used.

Example 5

Figure 9:
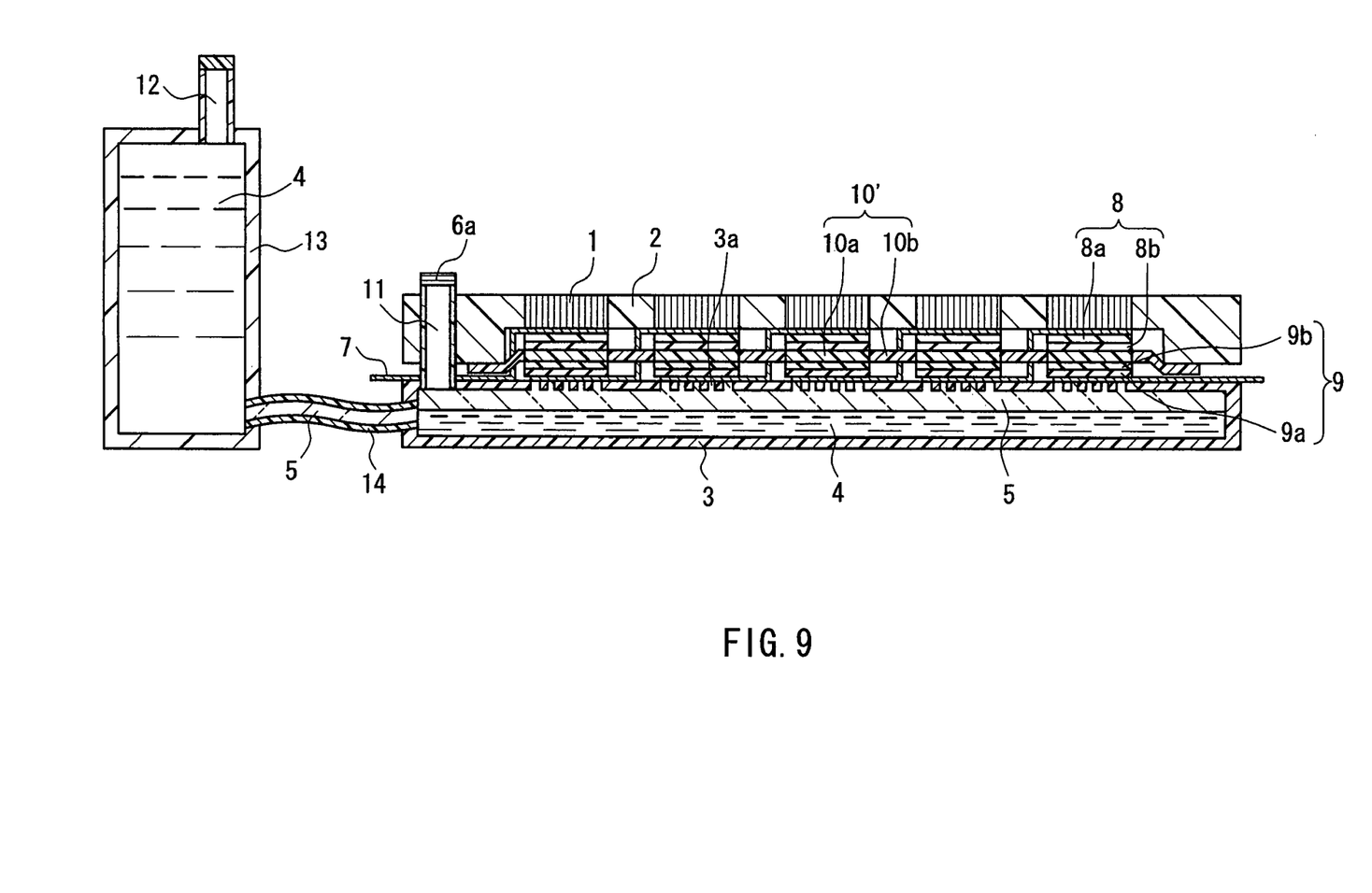
FIG. 9 is a sectional view showing a liquid fuel cell according to Example 5 of the present invention.

The liquid fuel cell was produced similarly to Example 4 except that the structure shown in FIG. 9 was used.

Example 6

The liquid fuel cell was produced similarly to Example 4 except that, as shown in FIG. 1, no insulator layer was disposed between the electrolyte layers of a plurality of the unit fuel cells, i.e., the unit fuel cells were formed so as to be separated from each other.

Then, an output of each of the unit fuel cells was measured using the liquid fuel cells of Examples 4 to 6. The output measurements were conducted as follows. Each unit cell was discharged at a constant current of 100 mA, and the voltage of each unit cell after 20 minutes was measured to determine the output. Then, the outputs of each unit cell were averaged. Table 2 shows the results.

TABLE 2

|  | Example 4 | Example 5 | Example 6 |
|---|---|---|---|
| Output (mW) | 150 | 163 | 121 |

As becomes clear form Table 2, the liquid fuel cells of Examples 4 and 5 have a larger output than the liquid fuel cell of Example 6 and thus have a structure suitable for miniaturization.

In addition, the output in Example 5 is larger than that in Example 4. This may be because in Example 5 the liquid pressure of the liquid fuel in the outside fuel tank allows the liquid fuel to move more smoothly to the vicinity of the negative electrode.

INDUSTRIAL APPLICABILITY

As described above, the present invention can provide a liquid fuel cell that is small and capable of generating electricity in a stable manner.

The invention claimed is:

1. A liquid fuel cell comprising:
   a plurality of unit liquid fuel cells, each comprising
   a positive electrode for reducing oxygen,
   a negative electrode for oxidizing a liquid fuel, and
   an electrolyte layer disposed between the positive electrode and the negative electrode for transporting protons; and
   a liquid fuel storing portion for storing liquid fuel;
   wherein the plurality of unit liquid fuel cells are disposed on the same plane,
   the liquid fuel storing portion comprises a gas-liquid separation hole having a gas-liquid separation film,
   the gas-liquid separation film is formed of a porous fluorocarbon resin film or a laminate composite of a porous fluorocarbon resin film and other gas-transmitting materials,
   a surface of the gas-liquid separation film is provided with a polymer coating film having a fluoroalkyl group with two or more fluorine atoms, and
   an electrically insulating continuous layer consisting of the electrolyte layer and a layer of an electrical insulator other than electrolytes;
   wherein each electrolyte layer of the plurality of unit liquid fuel cells are independent from each other.

2. The liquid fuel cell according to claim 1, wherein the plurality of unit liquid fuel cells are supplied with the liquid fuel from the liquid fuel storing portion shared by the plurality of unit liquid fuel cells.

3. The liquid fuel cell according to claim 1, wherein the plurality of unit liquid fuel cells are electrically connected in series.

4. The liquid fuel cell according to claim 1, wherein the liquid fuel storing portion is connected to another liquid fuel storing portion via a connecting portion.

5. The liquid fuel cell according to claim 4, further comprising a liquid fuel impregnation portion inside the connecting portion.

6. The liquid fuel cell according to claim 1, wherein the plurality of unit liquid fuel cells are opposed to each other via the liquid fuel storing portion.

7. The liquid fuel cell according to claim 6, wherein the plurality of unit liquid fuel cells that are opposed to each other via the liquid fuel storing portion are supplied with the liquid fuel from the liquid fuel storing portion shared by the plurality of unit liquid fuel cells.

8. The liquid fuel cell according to claim 6, wherein the plurality of unit liquid fuel cells that are opposed to each other via the liquid fuel storing portion are electrically connected in series.

9. The liquid fuel cell according to claim 6, wherein the liquid fuel storing portion is connected to another liquid fuel storing portion via connecting portion.

10. The liquid fuel cell according to claim 9, further comprising a liquid fuel impregnation portion inside the connecting portion.

* * * * *